United States Patent [19]

Kortman

[11] 3,825,935

[45] July 23, 1974

[54] ELECTRICAL SIGNAL REGISTER

[75] Inventor: Joe M. Kortman, Vancouver, Wash.

[73] Assignees: H. Dutton Hayward, Trustee of the Hilda Trusts, Tacoma; Joseph Schulein; Margaret A. Schulein, both of Vancouver, all of Wash.; part interest to each

[22] Filed: Oct. 2, 1972

[21] Appl. No.: 293,846

[52] U.S. Cl. .......... 346/34, 346/44, 346/79, 340/167 R

[51] Int. Cl. .......... G01d 9/00

[58] Field of Search .......... 340/167–168, 340/172.5, 173, 185, 408, 403, 416, 412; 346/33–34, 44, 57, 95; 235/150.3

[56] References Cited

UNITED STATES PATENTS

| | | | |
|---|---|---|---|
| 2,905,520 | 9/1959 | Anderson | 346/34 |
| 3,061,817 | 10/1962 | Blinston | 340/168 R |
| 3,072,804 | 1/1963 | Aaronson | 340/167 R |
| 3,118,722 | 1/1964 | Pullis et al. | 346/34 |
| 3,618,116 | 11/1971 | LaMartina et al. | 346/79 |
| 3,652,995 | 3/1972 | Amberg | 340/167 |

*Primary Examiner*—Richard B. Wilkinson
*Assistant Examiner*—Vit W. Miska
*Attorney, Agent, or Firm*—Kolisch, Hartwell & Dickinson

[57] ABSTRACT

Apparatus in an electrical signaling system for registering or making a record of signals produced by a plurality of remote signaling devices. The apparatus includes memory circuitry that immediately notes, and remembers, which, if any, devices have transmitted signals, search circuitry which recurrently searches the memory circuitry for such information, and printing mechanism which is actuated immediately in response to information thus uncovered by the search circuitry to print a permanent record reflecting such information. Searching of the memory circuitry stops during intervals of operation of the printing mechanism.

8 Claims, 2 Drawing Figures

PATENTED JUL 23 1974 3,825,935

ELECTRICAL SIGNAL REGISTER

BACKGROUND AND SUMMARY OF THE INVENTION

This invention pertains to apparatus employable in an electrical signaling system for making a record of signals produced by a plurality of remote signaling devices.

In various types of electrical signaling systems, such as those, for example, employed for the transmission of what might be thought of as supervisory security-type signals, it is often desired to produce a more-or-less permanent record of the occurrences of signal transmission. It is, of course, desirable that the making of such a record be done as economically and reliably as possible.

A general object of the present invention is to provide novel registering or recording apparatus which satisfactorily meets these objectives.

According to a preferred embodiment of the invention, the proposed apparatus comprises memory circuitry that immediately notes, and then remembers, which one, if any, of various remote signaling devices have transmitted signals, search circuitry which recurrently searches the memory circuitry for such information, and record-making equipment which is actuated immediately in response to information thus uncovered by the search circuitry to produce a record reflecting such information. The record-making equipment preferably takes the form of printing mechanism capable of printing such a record on a paper tape or the like.

One of the important performance features of the proposed apparatus—a feature which contributes to good reliability—is that searching of the memory circuitry stops during intervals of operation of the printing mechanism. Such performance assures the proper detection of all pertinent information contained in the memory circuitry.

DESCRIPTION OF THE DRAWINGS

Others objects and advantages attained by the invention will become more fully apparent as the description which follows is read in conjunction with the accompanying drawings, wherein.

DETAILED DESCRIPTION OF THE INVENTION

1. Explanation of Terminology

Figures 1, 2:
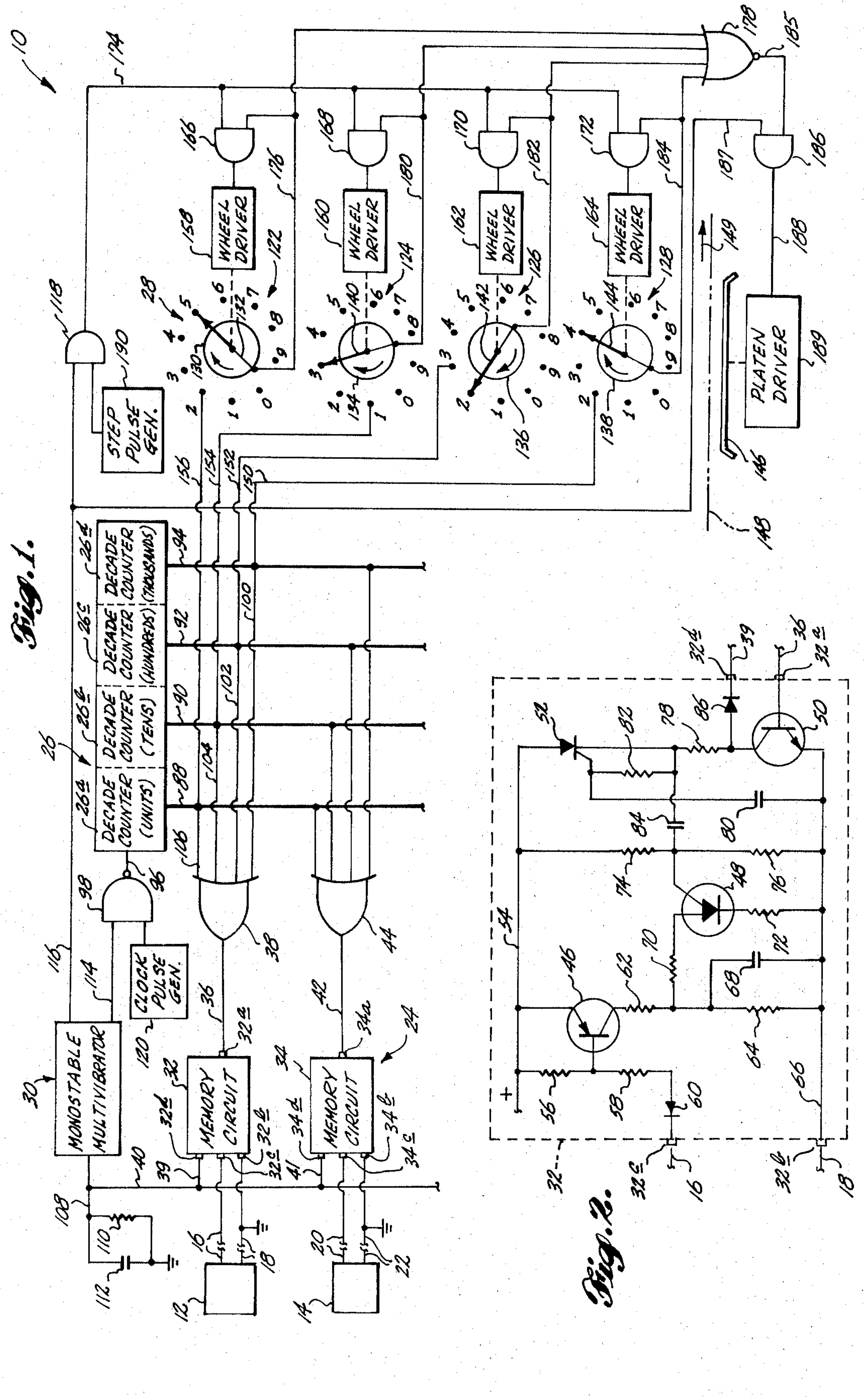
FIG. 1 is a schematic diagram, partly in block form, illustrating an electrical signaling system employing apparatus constructed according to the invention.
FIG. 2 is a circuit diagram illustrating details of construction of a memory circuit used in the system of FIG. 1.

Explaining briefly certain terminology which will be used in the description which follows, various components shown in the drawings operate in response to a pair of voltage levels. More specifically, one of these levels corresponds to a certain positive voltage (typically about +5 volts) which will be referred to hereinafter as a "1" state. The other level corresponds essentially to ground, and will be called hereinafter a "0" state. A terminal, or a conductor, having one of these voltage levels on it, will be referred to as being in, or as having on it, either a "1" or a "0" state.

2. Operational Descriptions of Certain Gates Employed

Among the components illustrated in the drawings, which respond to the two voltage levels just described, are certain gates. More specifically, four different types of gates, all conventional in construction, are used herein. These are referred to as AND, NAND, OR and NOR gates.

An AND gate functions as follows: with a 0 state on any input of the gate, the output thereof is held in a 0 state; with all inputs in a 1 state, the output is placed also in a 1 state.

In a NAND gate: with a 0 state on any input, the output is held in a 1 state; with all inputs in a 1 state, the output is placed in a 0 state.

In an OR gate: if any input is in a 1 state, the output of the gate is held also in a 1 state; if all inputs are in a 0 state, then the output is also in a 0 state.

Finally, a NOR gate functions whereby: if any input is in a 1 state, the output is held in a 0 state; if all inputs are placed in a 0 state, then the output is placed in a 1 state.

3. The System of FIG. 1

Turning now to FIG. 1, indicated generally at 10 is a portion of an electrical signaling system employing apparatus constructed according to the present invention. For the purpose of obtaining maximum clarity in this figure, a number of simplifications, which will be noted later, have been made. System 10 is employed herein for the transmission of what were referred to earlier as supervisory security-type signals. By way of example, the system might be in use for monitoring the locked or unlocked conditions of various doors and windows in some remote facility.

Included in system 10 are a plurality of signaling devices, such as the two shown at 12, 14, which devices are constructed to note the specific conditions of interest, such as the locked or unlocked conditions just mentioned. Devices 12, 14 are conventional, and herein comprise, essentially, switches which are opened or closed selectively in response to the particular conditions which they are monitoring. When the switch in a signaling device is opened (which might signify that a door or a window is locked), the device is in what is called a nonsignaling state. When the switch is closed (which might indicate that the door or window is unlocked), the device is in a signaling state. System 10, as disclosed herein, can accommodate up to 10,000 such signaling devices.

In system 10, the signaling devices, and more particularly the switches therein, are each connected in the system by means of a pair of conductors, which conductors might typically take the form of a conventional telephone line pair. These conductors extend from the respective remote locations of the signaling devices to some central monitoring station where the balance of the system is situated. Thus, connecting opposite sides of the switch in device 12 in the system are conductors 16, 18 (forming one telephone line pair), and connecting opposite sides of the switch in device 14 are conductors 20, 22 (forming another telephone line pair).

As can be seen, the lower conductor (in FIG. 1) for each signaling device is grounded. Such conductors are thus in 0 states. For a reason which will become apparent, the upper conductors are normally in 1 states so long as the switches in their respective associated signaling devices are open. On a switch in a signaling device closing, a 0 state is placed on its associated upper conductor.

Further included in system 10, and forming portions of the apparatus of the present invention, are a memory, or memory means, 24, a counter chain, or search means, 26, a printing mechanism, or a record-making means, 28, and a monostable multivibrator, or interconnecting means, 30. These parts are referred to collectively herein as an electrical signal register.

Memory 24 includes a plurality of memory circuits, such as the two memory circuits indicated at 32, 34. One such memory circuit is provided for each different signaling device in the system. Memory circuit 32 is associated with signaling device 12, and memory circuit 34 is associated with signaling device 14.

Each memory circuit includes what might be thought of as three input terminals and an output terminal. In circuits 32, 34, the respective input terminals are shown at 32*a*, 32*b*, 32*c* and 34*a*, 34*b*, 34*c*, and the output terminals are shown at 32*d* and 34*d*. Terminals 32*a*, 34*a* are connected through conductors 36, 42, respectively, to the outputs of a pair of four-input OR gates 38, 44, respectively; terminals 32*b*, 34*b* are connected to conductors 18, 22, respectively; terminals 32*c*, 34*c* are connected to conductors 16, 20, respectively; and output terminals 32*d*, 34*d* are connected through conductors 39, 41, respectively, to a common conductor 40. Similar terminals and connections exist for the other (nonillustrated) memory circuits in system 10.

The various memory circuits are alike in construction and operation. FIG. 2 shows details of circuit 32. Turning for a moment to this figure, circuit 32 includes a PNP transistor 46, a programmable unijunction transistor 48, an NPN transistor 50, and a silicon-controlled rectifier 52. Also included in circuit 32 is a positive voltage supply conductor 54 which is connected to a suitable source (not shown) of positive voltage.

With respect to transistor 46, its emitter is connected directly to conductor 54, its base is connected through a resistor 56 to conductor 54, and through a resistor 58 and a diode 60 to terminal 32*c*, and its collector is connected through series resistors 62, 64 to a conductor 66. Conductor 66 is connected to terminal 32*b*.

The junction between resistors 62, 64 is connected through a capacitor 68 to conductor 66, and through a resistor 70 to the anode of transistor 48. The cathode of transistor 48 is connected through a resistor 72 to conductor 66. The gate of transistor 48 is connected to the junction between a pair of resistors 74, 76—the former connecting with conductor 54, and the latter connecting with conductor 66.

The anode of rectifier 52 is connected directly to conductor 54, and the cathode of this rectifier is connected through a resistor 78 to the collector of transistor 50. The gate of rectifier 52 is connected through a capacitor 80 to conductor 66, and through a resistor 82 to the junction between the rectifier's cathode and resistor 78. A capacitor 84 connects this junction and the junction between resistors 74, 76.

Further considering transistor 50, its collector is connected to terminal 32*d* through a diode 86, its base is connected directly to terminal 32*a*, and its emitter is connected directly to conductor 66.

Explaining briefly how circuit 32 performs, a 1 state is applied to conductor 16 from conductor 54 through resistors 56, 58, diode 60, and terminal 32*c*. Transistors 46, 48, 50, and rectifier 52, are normally nonconductive. When the voltage on conductor 16 changes to a 0 state (through closing of the switch in signaling device 12), transistors 46, 48 switch into conduction. Assuming that a 1 state then exists on conductor 36 (which will normally be the case, as will become apparent), when transistor 48 switches into conduction, rectifier 52 and transistor 50 also switch into conduction. So long as a 0 state remains on conductor 16, transistors 46, 48 remain conductive. So long as a 1 state remains on conductor 36, rectifier 52 and transistor 50 remain conductive.

Under these circumstances, should a 0 state momentarily be applied to conductor 36, transistor 50 and rectifier 52 stop conducting, with such action resulting in the supply of a positive voltage pulse at terminal 32*d*.

If, at the time that a 0 state is applied to conductor 16, a 0 exists on conductor 36, transistors 46, 48 conduct as just above described. Rectifier 52, however, conducts only momentarily, and transistor 50 not at all. Such momentary conduction in the rectifier results in the supply of a positive voltage pulse at terminal 32*d*.

Counter chain 26 includes four conventional cascade-connected decade counters indicated generally at 26*a*, 26*b*, 26*c*, 26*d*. Counter 26*a* will be referred to herein as a "units" counter, counter 26*b* as "tens" counter, counter 26*c* as a "hundreds" counter, and counter 26*d* as a "thousands" counter. Each of these counters includes the usual counting and reset terminals, as well as ten different output terminals. It will be apparent that in FIG. 1 the illustrations of these counters have been greatly simplified. More specifically, the four counters are represented as forming portions of a single block. Extending from the bottom side of each counter in the figure is a heavy line representing a cable carrying ten conductors, each of such conductors being connected to a different one of the ten output terminals in the counter. These conductors are referred to herein collectively as indicating means. The cables for counters 26*a*, 26*b*, 26*c*, 26*d* are shown at 88, 90, 92, 94, respectively. The interconnections between adjacent counters are conventional, and are not illustrated. The counting terminal of counter 26*a* is connected through a conductor 96 to the output of a two-input NAND gate 98.

Explaining briefly the operation of counter chain 26, in each decade counter, a new count is registered each time that the counting input in the counter changes from a 1 state to a 0 state. Thus, counter 26*a* registers a new count each time that the state on conductor 96 changes from 1 to 0. Counter 26*b* registers a new count for each ten counts registered by counter 26*a*. Similarly, counters 26*c*, 26*d* register a new count, respectively, for each ten counts registered by counters 26*b*, 26*c*, respectively.

The ten output terminals in a decade counter might be thought of as being numbered 0–9, inclusive. With the counter in a zero-count condition, the 0 output terminal is in a 0 state, and all other output terminals are in 1 states; with a count of one stored in the counter, the 1 output terminal is in a 0 state, with all other output terminals then being in 1 states; and so on, until with a count of nine stored in the counter, the 9 output terminal is in a 0 state, all other output terminals then being in 1 states.

Continuing a description of what is shown in FIG. 1, in accordance with a selected numerical "address," between the numbers 0–9,999, inclusive, assigned to signaling device 12, the four inputs of OR gate 38 are each connected to a single conductor in the four different cables (88, 90, 92, 94) extending from counters 26*a*, 26*b*, 26*c*, 26*d*. More specifically, and assuming that the numerical address assigned to signaling device 12 is "2312": the lowermost input of gate 38 is connected through a conductor 100 to the conductor in cable 94 which is connected to the 2 output terminal of "thousands" counter 26*d*; the next lowermost input of gate 38 is connected through a conductor 102 to the conductor in cable 92 which is connected to the three output terminal of "hundreds" counter 26*c*; the next lowermost input of gate 38 is connected through a conductor 104 to the conductor in cable 90 which is connected to the 1 output terminal of "tens" counter 26*b*; and the upper input of gate 38 is connected through a conductor 106 to the conductor in cable 88 which is connected to the 2 output terminal of "units" counter 26*a*. For simplicity in the drawings, these respective connections are simply represented as large dots at the points of intersection between cables 88, 90, 92, 94 and conductors 100, 102, 104, 106. Similar connections are provided between the inputs of OR gate 44 and conductors in cables 88, 90, 92, 94—such conductors in this case relating to the assigned numerical address of signaling device 14.

The upper end of conductor 40 in FIG. 1 is connected to a conductor 108 which is connected to the pulse-input terminal in multivibrator 30. Conductor 108 is connected to ground through the parallel combination of a resistor 110 and a capacitor 112. The lower output terminal of multivibrator 30 is connected through a conductor 114 to the upper input of gate 98. The upper output terminal of the multivibrator is connected through a conductor 116 to the upper input of an AND gate 118. Connected to the lower input of gate 98 is a conventional generator 120 of square wave "clock" pulses.

Multivibrator 30 is normally in a condition applying a 1 state to conductor 114 and a 0 state to conductor 116. On a positive voltage pulse occurring on conductor 108, the multivibrator switches to a new condition applying a 0 state to conductor 114 and a 1 state to conductor 116. Such a condition herein lasts for about 1.5 seconds, whereupon the voltage states on conductors 114, 116 return to their original conditions. The reason for the 1.5 second time interval just mentioned will be explained shortly.

Clock pulse generator 120 when operating produces pulses at a frequency of about 3,000 Hertz, which pulses alternate the voltage state on the lower input of gate 98 between 0 and 1.

Printing mechanism 28 is conventional in construction, including herein four printer-counter decade modules 122, 124, 126, 128, such as the modules designated CD10E made by General Controls ITT, 1838 Flower Street, Glendale, Calif. Modules 122, 124, 126, 128 are substantially the same in construction. Considering module 122 it includes a wheel, or printing element, 130 on the periphery of which are formed the ten raised, equally angularly spaced digits 0–9, inclusive. Wheel 130 carries an electrical wiper, indicated by arrow 132, which, depending upon the angular position of the wheel, is adapted to contact one of ten different equally angularly distributed outer contacts contained in the module. These 10 different contacts in module 122 have been designated 0–9, inclusive, in FIG. 1. Wheel 130 is shown in a position with wiper 132 engaging outer contact 5 in module 122.

The other three modules are similar in construction. Thus, modules 124, 126, 128 include wheels 134, 136, 138, respectively, and wipers 140, 142, 144, respectively. Modules 124, 126, 128 also each include a set of ten equally angularly distributed outer contacts, such as the ten outer contacts in module 122. In module 124, wheel 134 is shown in a position with wiper 140 engaging outer contact 3; in module 126 wheel 136 is shown in a position with wiper 142 engaging outer contact 2; and in module 128 wheel 138 is shown in a position with wiper 144 engaging outer contact 4. As was true in the case of wheel 130, wheels 140, 142, 144 each also carry on their peripheries the ten raised, equally angularly spaced digits 0–9, inclusive.

Also included in printing mechanism 28 is a conventional movable platen 146 which confronts the peripheries of wheels 130, 134, 136, 138. It should be understood that these wheels have been distributed in FIG. 1 in a manner best enabling the showing of electrical connections in the modules. In actuality, wheels 130, 134, 136, 138 are mounted for side-by-side rotation, on a common axis, confronting platen 146. Extending between platen 146 and the wheels is a movable paper tape represented at 148 by the dash-double-dot line. With platen 146 moved toward the wheels, numbers on the latter are suitably printed on tape 148, such numbers corresponding to the angular positions of the wheels. More specifically, and with respect to each of the wheels in the modules, a wheel prints on the tape whatever is the number of the outer contact then engaged by the wheel's associated wiper. For example, were platen 146 to be moved against the wheels with the latter in the positions shown in FIG. 1, the number 4235 would be printed on the tape. Suitable means (not shown) is provided for automatically advancing the tape a short distance in the direction of arrow 149 after such a printing operation.

In mechanism 28, module 128 may be thought of as a "thousands" module, module 126 as a "hundreds" module, module 124 as a "tens" module, and module 122 as a "units" module.

The ten outer contacts in "units" module 122 are each connected to a different one of the ten conductors in cable 88 coming from "units" counter 26*a*. More specifically: outer contact 0 is connected to that conductor in cable 88 which is connected to the 0 output terminal in counter 26*a*; outer contact 1 is connected to that conductor in cable 88 which is connected to the 1 output terminal in the counter; and so on.

In similar fashion, the outer contacts in "tens" module 124 are connected to the conductors in cable 90; the outer contacts in "hundreds" module 126 are connected to the conductors in cable 92; and the outer contacts in "thousands" module 128 are connected to the conductors in cable 94.

To simplify FIG. 1, showings of such connections have been limited to those associated with the "address," "2312," of signaling device 12. Thus, a conductor 150 is shown extending between outer contact 2 in "thousands" module 128 and cable 94; a conductor 152 is shown extending between outer contact 3 in "hundreds" module 126 and cable 92; a conductor 154 is shown extending between outer contact 1 in "tens" module 124 and cable 90; and a conductor 156 is shown extending between outer contact 2 in "units" module 122 and cable 88.

Provided for driving, or stepping, the wheels in modules 122, 124, 126, 128 are conventional wheel driver circuits 158, 160, 162, 164, respectively. Input terminals in circuits 158, 160, 162, 164 are connected to the outputs of AND gates 166, 168, 170, 172, respectively. With operation of a wheel driver circuit, the associated wheel turns, in the direction of the arrow on the wheel (in FIG. 1), to place its associated wiper in engagement with the next adjacent outer contact. More specifically, with a single operation of wheel driver circuit 158, wheel 130 advances to place wiper 132 in engagement with outer contact 6 in module 122.

The upper input of each of gates 166, 168, 170, 172 is connected through a conductor 174 to the output of gate 118. The lower input of gate 166 is connected to a conductor 176, one end of which is connected with wiper 132, and the other end of which is connected with one input in a four-input NOR gate 178. The lower input of gate 168 is connected to conductor 180 which interconnects wiper 140 and another input of gate 178. Similarly, the lower inputs of gates 170, 172 are connected to conductors 182, 184, respectively, which interconnect wipers 142, 144, respectively, and two other inputs of gate 178. The output of gate 178 is connected through a conductor 185 to one input of a two-input AND gate 186, the other input of which is connected through a conductor 187 to conductor 116. The output of gate 186 is connected through a conductor 188 to the pulse input terminal of a conventional platen driver 189 which is ganged to platen 146.

Completing a description of what is shown in FIG. 1, indicated in block form generally at 190 is a "step" pulse generator, the output of which is connected to the lower input of gate 118. When operating, the step pulse generator produces a square wave voltage at a frequency of about 13 Hertz which alternates the voltage state between 0 and 1 on the lower input of gate 118.

4. Operation of the System

Explaining now how system 10 as a whole operates, let us assume initially that all signaling devices in the system are in nonsignaling states. As a consequence, the transistors and silicon-controlled rectifiers in all of the memory circuits in memory 24 are initially nonconductive.

Pulse generators 120, 190 are operating, and supply pulses as described. Multivibrator 30 is in a condition placing a 1 state on conductor 114 and a 0 state on conductors 116, 187. As a consequence, pulses from clock pulse generator 120 are passed through gate 98 to conductor 96—these pulses producing counting in counter chain 26, and hence searching of the conditions of the memory circuits. Pulses from step pulse generator 190, however, are blocked from passing through gate 118. More specifically, because of the 0 state now existing on conductor 116, the output of gate 118 is held in a 0 state. With this being the case, the outputs of gates 166, 168, 170, 172 are also held in 0 states. Further, the output of gate 178 is normally held in a 0 state. The output of gate 186 is also in a 0 state.

With respect to the OR gates which are connected to the memory circuits, the outputs of these gates are normally in 1 states, except under circumstances of all four of the inputs in the gates simultaneously being in 0 states. It will thus be apparent that with respect to each of these OR gates, and for each "cycle" of counting in counter chain 26, there is only one count condition in the counter which will result in the OR gate having a 0 state on its output terminal. In the case of oR gate 38, this situation will occur when a count of two exists in counter **26*d*, a count of three in counter 26*c*, a count of one in counter 26*b*, and a count of two in counter 26*a***.

With all of the signaling devices being in nonsignaling states, as is now being assumed, voltage state changes on the outputs of the OR gates connected to the memory circuits have no consequential effect. Thus, in the absence of any signaling device being in a signaling state, the system simply remains in a condition with counter chain 26 counting in recurrent cycles. It will be noted that each cycle of operation in the counter chain requires 10,000 pulses from clock pulse generator 120. With generator 120 operating at the frequency mentioned earlier, such a cycle takes about 3-⅓ seconds to complete.

Let us assume now that, at some point in time, signaling device 12 is switched into a signaling state, whereupon a 0 state is applied to conductor 16. What results then, is that transistors 46, 48 switch into conduction. In all probability, a 1 state voltage will at this time also exist on conductor 36, with the result that transistor 50 and rectifier 52 will also switch into conduction.

Nothing further of significance occurs until that count condition occurs in counter chain 26 which places 0 states on all four of the inputs of gate 38. As has been mentioned earlier, this will occur with a count of two in counter **26*d*, a count of three in counter 26*c*, a count of one in counter 26*b*, and a count of two in counter 26*a*. On this occurring, conductor 36 is placed in a 0 state, whereupon transistor 50 and rectifier 52 stop conducting. As a result, a positive voltage pulse is applied to terminal 32*d*, and hence to the pulse input terminal of multivibrator 30. Such action in system 10 constitutes "detection" of the fact that signaling device 12, as noted by memory circuit 32**, is in a signaling state.

With the positive voltage pulse just mentioned applied to the pulse input terminal of multivibrator 30, the multivibration, for a period of about 1.5 seconds, applies a 0 state to conductor 114, and a 1 state to conductors 116, 187. As a consequence, the supply of clock pulses from generator 120 is now blocked from reaching counter chain 26, and step pulses from step pulse generator 190 are admitted through gate 118 to the upper inputs of gates 166, 168, 170, 172. It will thus be apparent that the searching operation performed by counter chain 26 with respect to the information contained in memory 24 has been stopped on detection of the signaling state existing in signaling device 12. The voltage states on the four inputs of gate 38 remain in 0 states, which states are also applied through conductors 150, 152, 154, 156 to outer contacts 2, 3, 1, 2, respectively, in modules 128, 126, 124, 122, respectively.

With stepping pulses from generator 190 now applied to gates 166, 168, 170, 172, these gates cause operations of the wheel driver circuits, which in turn step the positions of the wheels in modules 122, 124, 126, 128. With respect to the wheel in a given module, the wheel continues stepping until its associated wiper comes into engagement with the outer contact which is then in a 0 state. For each wheel, it will be noted that only one of such outer contacts is then in a 0 state. Because of the connections existing between these outer contacts and the conductors in cables 88, 90, 92, 94, the particular outer contacts which will then be in 0 states will correspond to the numerical address of the signaling device whose signaling state has just been detected. More specifically, and in the example now being described, the contacts which will be in 0 states are outer contact 2 in module 128, outer contact 3 in module 126, outer contact 1 in module 124, and outer contact 2 in module 122.

On the wiper in a wheel engaging the outer contact in a 0 state, the supply of stepping pulses to the associated wheel driver circuit is shut off through the associated AND gate. On all four of the wheels stopping, it will be seen that 0 state voltages are applied to all four of the inputs of NOR gate 178. Under such circumstances, a 1 state will be applied to conductor 185 which, together with the 1 state then existing on conductor 187, will result in a 1 state being applied to the pulse input of platen driver 189. Such action results in operation of platen driver 189. As a consequence, platen 146 will be driven momentarily to press tape 148 against the wheels in the four modules, with numbers on these wheels then being printed on the tape. In the example just described, the number which will be printed on the tape will be 2312—the numerical address of signaling device 12.

The 1.5 second time interval associated with multivibrator 30 has been selected to allow ample time for all of the wheels in the modules to arrive at their proper positions, and for platen 146 to be actuated. At the end of this time interval, the multivibrator returns a 1 state to 114, and a 0 state to conductors 116, 187. On this change occurring, clock pulses are again supplied to counter chain 26, and step pulses are again blocked by gate 118. The counter chain then continues searching the memory circuits to determine whether any other signaling devices are in signaling states.

Apparatus is thus provided which meets the objectives set forth earlier. It will be noted that the proposed apparatus is capable of performing with a high degree of reliability, owing to the way in which searching of the memory circuits stops to permit recording of the "address" of any signaling device in a signaling state. Very conveniently, the voltage states on the conductors in cables 88, 90, 92, 94, which states effect searching of the memory circuits, are the same voltage states applied to the outer contacts in modules 122, 124, 126, 128 to control the end of stepping of the wheels in the modules.

While a preferred embodiment of the invention has been described herein, it should be obvious to those skilled in the art that variations and modifications are possible without departing from the spirit of the invention.

It is claimed and desired to secure by Letters Patent:

1. An electrical signal register for monitoring a plurality of individually identified remote electrical signaling devices, each placeable selectively in either a signaling or a nonsignaling state, and for recording the identity of any of said devices upon, but only upon, its being placed at least mementarily in a signaling state, said register comprising memory means for individually noting and remembering the at least momentary placing of any device in a signaling state, said means comprising a plurality of individually addressable memory elements, each one connected to a different one of said plurality of signaling devices, search means operatively connected to said memory element for serially, cyclically addressing the same to detect any such remembering thereby, record-making means for recording the identity of any device placed at least momentarily in a signaling state, as noted and remembered by the memory element connected to said device, said record-making means comprising means for interrogating said search means to determine the address of said memory element, and means for recording the identity of the corresponding signaling device, and means operatively interconnecting said memory means, search means, and record-making means for interrupting said addressing upon detection by said search means of a remembering by a memory element, and for simultaneously activating said record-making means, whereupon said search means is interrogated and the identity of the signaling device corresponding to said memory element is recorded.

2. The register of claim 1, wherein said record-making means comprises a printing mechanism having a movable printing element whose position in said mechanism is adjustable, during a period when operation of said search means is interrupted, in accordance with memory element address information supplied by said search means.

3. The register of claim 1 wherein said means operatively interconnecting said memory means, search means and record-making means includes means for automatically restarting said search means after a period of time sufficient for the record-making means to record the identity of the device which, by being placed in a signaling state, caused operation of the search means to be interrupted.

4. In an electrical signaling system including a plurality of individually identified electrical signaling devices each placeable selectively in either a signaling or a nonsignaling state, an electrical signal register for monitoring the state of each such device, and for recording the identity of any device upon, but only upon, its being placed at least momentarily in a signaling state, said register comprising memory means for individually noting the placing, at least momentarily, of any device in a signaling state, and for thereupon remembering such noting, said means comprising a plurality of individually addressable memory elements, each one connected to a different one of said plurality of signaling devices, counter means operatively connected to said memory means for serially, cyclically addressing said elements, means interconnecting said memory means and counter means for temporarily inhibiting operation of said counter means upon the addressing by said counter means of a memory element remembering a noting, record-making means for recording the identity of any device placed at least momentarily in a signaling state, as noted and remembered by the memory element connected to said device, said record-making means comprising means for interrogating said counter means to determine the address of said memory element, and means for recording the identity of the corresponding signaling device, and means interconnecting said memory means and record-making means for activating said record-making means upon the addressing by said counter means of a memory element remembering a noting, whereupon said counter means is interrogated and the identity of the signaling device recorded.

5. The system of claim 4, wherein said record-making means comprises a printing mechanism having a movable printing element whose position in said mechanism is adjustable, during a period when operation of said counter means is inhibited, in accordance with memory element address information indicated by said counter means.

6. The system of claim 4 wherein said means interconnecting said memory means and counter means includes means for automatically restarting said counter means after a period of time sufficient for the record-making means to record the identity of the device which, by being placed in a signaling state, caused operation of the search means to be interrupted.

7. In an electrical signaling system including a plurality of individually identified electrical signaling devices, each placeable selectively in either a signaling or non-signaling state, an electrical signal register for monitoring the state of each such device, and for recording the identity of any device upon, but only upon, its being placed at least momentarily in a signaling state, said register comprising memory means for individually noting the placing, at least momentarily, of any device in a signaling state, and for thereupon remembering such noting, said means comprising a plurality of individually addressable memory elements, each one connected to a different one of said plurality of signaling devices, search means including a counter, operatively connected to said memory means for serially, cyclically addressing said elements to detect any such remembering thereby, record-making means for recording the identity of any device placed at least momentarily in a signaling state, as noted and remembered by the memory element connected to said device, and detected by said search means, said record-making means comprising means for interrogating said counter to determine the address of said memory element, and means for recording the identity of the corresponding signaling device, and switch means interconnecting said memory means, search means and record-making means for temporarily inhibiting operation of said counter upon its addressing a memory element remembering a noting, and for simultaneously activating said record-making means, whereupon said counter is interrogated and the identity recorded of the device which, by being placed in a signaling state, caused operation of the search means to be inhibited, said memory means including means operatively connected to said switch means for activating the same upon a memory element remembering a noting being addressed by said counter.

8. The system of claim 7, wherein said switch means includes means for automatically restarting said counter after a period of time sufficient for the record-making means to record the identity of said device.

* * * * *